(12) United States Patent
Christian et al.

(10) Patent No.: US 8,038,787 B2
(45) Date of Patent: Oct. 18, 2011

(54) COATING FORMULATION HAVING IMPROVED RHEOLOGICAL PROPERTIES

(75) Inventors: Hans-Dieter Christian, Alzenau (DE); Reinhard Behl, Alzenau (DE); Hans-Werner Köhler, Bruchköbel (DE); Jürgen Meyer, Stockstadt (DE)

(73) Assignee: Evonik Degussa GmbH, Essen (DE)

( * ) Notice: Subject to any disclaimer, the term of this patent is extended or adjusted under 35 U.S.C. 154(b) by 795 days.

(21) Appl. No.: 11/153,379

(22) Filed: Jun. 16, 2005

(65) Prior Publication Data

US 2005/0282935 A1    Dec. 22, 2005

(30) Foreign Application Priority Data

Jun. 16, 2004 (DE) .................. 10 2004 029 073

(51) Int. Cl.
*C09D 1/00* (2006.01)
(52) U.S. Cl. .................. 106/287.34; 106/312
(58) Field of Classification Search .............. 252/8.57; 106/287.34, 312
See application file for complete search history.

(56) References Cited

U.S. PATENT DOCUMENTS

| | | | | |
|---|---|---|---|---|
| 4,221,896 A | * | 9/1980 | Endo | 528/28 |
| 4,804,737 A | * | 2/1989 | Berger et al. | 528/26 |
| 5,087,684 A | * | 2/1992 | Perrin | 528/22 |
| 5,959,005 A | * | 9/1999 | Hartmann et al. | 523/213 |
| 6,191,122 B1 | * | 2/2001 | Lux et al. | 514/122 |
| 6,248,493 B1 | * | 6/2001 | Ogura et al. | 430/109.4 |
| 6,406,775 B1 | * | 6/2002 | Houde | 428/32.34 |
| 6,685,985 B2 | * | 2/2004 | Boisseau et al. | 427/180 |
| 6,759,478 B2 | * | 7/2004 | Anderson et al. | 524/588 |
| 2002/0040661 A1 | * | 4/2002 | Glaum et al. | 106/287.35 |
| 2002/0173561 A1 | * | 11/2002 | Field | 523/216 |
| 2003/0103890 A1 | * | 6/2003 | Konya et al. | 423/335 |
| 2004/0022946 A1 | * | 2/2004 | Vincent et al. | 427/258 |
| 2005/0244442 A1 | * | 11/2005 | Sabino et al. | 424/401 |

FOREIGN PATENT DOCUMENTS

| | | | |
|---|---|---|---|
| JP | 07061907 | * | 3/1995 |
| WO | WO 84/00375 | | 2/1984 |
| WO | WO 2004/039485 | * | 5/2004 |

* cited by examiner

*Primary Examiner* — Amina Khan
(74) *Attorney, Agent, or Firm* — Oblon, Spivak, McClelland, Maier & Neustadt, L.L.P.

(57) ABSTRACT

The present invention relates to coating formulations comprising surface-modified silicon dioxides. The coating formulations are useful in applications such as architectural paints for buildings, windows and doors.

21 Claims, No Drawings

COATING FORMULATION HAVING IMPROVED RHEOLOGICAL PROPERTIES

CROSS-REFERENCE TO RELATED APPLICATIONS

This application claims priority to German Patent Application 102004029073.3 filed Jun. 16, 2004, the entire contents of which is herein incorporated by reference.

BACKGROUND OF THE INVENTION

1. Field of the Invention

The present invention relates to coating formulations comprising surface-modified silicon dioxides and having improved performance properties and to the use thereof.

2. Description of the Related Art

Coating formulations comprising thixotropic alkyd resins became increasingly of interest at the end of the 1940s. The development began with alkyd resins of standard construction being given an unusually high viscosity, thereby producing a certain thixotropy. A key advance was achieved by reacting oils or alkyd resins with polyamides which are prepared by condensing polymerized linolenic acid with polyamines. The resulting resins display a strongly pronounced thixotropy, so that coating formulations comprising these resins do not run on vertical surfaces—thus concerns about the sagging referred to as "curtaining" are minimized—and also do not drip from the brush. The thixotropy also prevents the settling of pigments of relatively high specific gravity. These types of formulations are therefore suitable for producing household enamels which can be used in particular by laypersons.

Thixotropic alkyd resins can be mixed with the majority of long-oil standard alkyd resins, which allows the degree of thixotropy to be adjusted. This approach is used very frequently, for example, in the production of architectural paints, where a high thixotropy would lessen the flow and gloss of the paints. Thixotropic resins can additionally be used to produce paints featuring eggshell gloss.

In order to increase the consistency of a paint or coating material, there is a need for thickeners, along with suitable binders, solvent mixtures and, where appropriate, pigment/filler fractions. In solventborne coating systems a distinction is made between thickeners and thixotropic agents. The action of thickeners/thixotropic agents is based on different effects such as swelling, gelling, association of micelles, solvation, development of network structures and/or hydrogen bonds and the interaction of these effects. In aqueous systems the degree of thickening is determined by the molecular structure and the molar weight of the hydrocolloids.

One specific group of thickeners are the associative thickeners. They differ from the modified natural substances and the fully synthetic organic thickeners in that, in addition to water-solubilizing hydrophilic groups, their molecular structure also includes hydrophobic end groups or side groups. This gives associative thickeners a surfactant character and the capacity to form micelles. In contrast to the thickeners which act solely by swelling in the aqueous phase, associative thickeners enter into interaction with the latex particles of the binder dispersion and connect them via "micelle bridges." A notable feature is that associative thickeners thicken fine dispersions, owing to their larger overall surface area, to a greater extent than coarse dispersions.

By means of associative thickeners the rheological behavior of paint systems can be adjusted so that, on the one hand, in a state of low shear the paint has a high viscosity, and so, when the paint is applied to a vertical surface, there is no paint running (curtaining). On the other hand, the mechanical stress in a state of high shear lowers the viscosity (shear-thinning), and so the paint becomes highly mobile, and can easily be conveyed through a narrow nozzle such as, for example, when being applied by spray gun.

Paints and stains, in addition to the abovementioned components, often also include matting agents prepared synthetically or composed of natural materials, which are in the form of fine particles and are used in various applications such as, for example, industrial coatings, coatings on leather and on plastic, and printing inks. The matting agents used in the paints and stains ideally exhibit the following properties: high pore volume, narrow particle distribution, suitable particle size tailored to the respective application, and narrow pore distribution. Silicas (precipitated silicas and silicas prepared on the basis of pyrogenic (fumed) silicas) and/or silica gels possess most of the aforementioned properties, and therefore, are commonly used as matting agents.

When the abovementioned matting agents are used in thixotropic decorating/alkyd paints or in aqueous dispersion-based paints and stains, they often adversely affect the action of the associative thickeners and hence drastically lower the viscosity of the paint.

SUMMARY OF THE INVENTION

On the basis of the aforementioned state of the art, therefore, the object of the present invention is to provide innovative coating formulations which overcome the disadvantages specified above. In particular, the coating formulations of the invention have improved performance properties such as improved rheological properties. A further aspect of the present invention is to provide a process for preparing the coating formulations.

Further aspects of the present invention that are, not mentioned explicitly, will emerge from the overall context of the subsequent description and examples.

Surprisingly it has been found that the object of the present invention is achieved by the coating formulations defined in more detail in the following description and also in the claims and the examples.

The present invention accordingly provides coating formulations comprising at least one surface-modified silicon dioxide, wherein the viscosity of the coating formulation as measured in a state of low shear (6 rpm) after preparation of the coating formulation with a surface-modified silicon dioxide and 1 day's storage of the completed coating formulation at 23° C. and 50% relative humidity (rh) is lower by not more than 40% than the viscosity of an identical coating formulation without a surface-modified silicon dioxide, as measured in a state of low shear (6 rpm), following preparation of the coating formulation and 1 day's storage of the completed coating formulation at 23° C. and 50% rh;

the viscosity of the coating formulation as measured in a state of high shear (60 rpm) after preparation of the coating formulation with a surface-modified silicon dioxide and 1 day's storage of the completed coating formulation at 23° C. and 50% relative humidity (rh) is lower by not more than 25% than the viscosity of an identical coating formulation without a surface-modified silicon dioxide, as measured in a state of high shear (60 rpm), following preparation of the coating formulation and 1 day's storage of the completed coating formulation at 23° C. and 50% rh.

The present invention further provides for the use of the coating formulations of the invention as architectural paint, for the coating, for example, of parts of buildings, of window frames, of doors, etc.

With the coating formulations of the invention, success has been achieved, for the first time, in preparing thixotropic or pseudoplastic coating formulations which comprise silicon dioxides but whose rheological properties are not adversely affected by the silicon dioxides.

In addition to the outstanding rheological properties, the coating formulations of the invention are distinguished by:
good suspension behavior,
high matting efficiency,
enhanced transparency, and
high scratch resistances in the film surfaces.

They are, therefore, outstandingly suitable for use as architectural paints for coating parts of buildings, window frames, doors, etc.

DETAILED DESCRIPTION OF THE PREFERRED EMBODIMENTS

The present invention is described in detail below, starting with definitions of a few important terms.

Coating formulations for the purposes of the present invention are formulations comprising at least one polymer component and/or a mixture of two or more physically or chemically crosslinking polymer components, at least one solvent, and at least one surface-modified silicon dioxide. The coating formulations of the invention are preferably thixotropic or pseudoplastic coating formulations, especially alkyd-resin-based decorating paints and dispersion-based paints (emulsion paints).

The meaning of thixotropically formulated or pseudoplastic coating formulations is known to the skilled worker and is described in general reference works such as, for example, Römpp Lexikon Chemie—Version 2.0, 1999. A particular feature of thixotropic or pseudoplastic coating materials is that their viscosity goes down under exposure to mechanical forces but goes up again when mechanical stress has ended.

Silicon dioxides for the purposes of the present invention are selected from the group consisting of precipitated silicas, pyrogenic (fumed) silicas, silica gels, modified pyrogenic silicas and mixtures of said silicon dioxides. Where the surface of the silicon dioxides has been modified with at least one polymer, they are referred to as surface-modified silicon dioxides. Silicas prepared on the basis of pyrogenic silicas are silicas which can be prepared on the basis of pyrogenic silicas in accordance with DE 24 14 478.

Surface modification means the chemical and/or physical attachment of organic components to the surface of the silicon dioxide particles. In other words, in the case of surface-modified silicon dioxides, at least part of the surface of the silicon dioxide particles is occupied by the surface modifier.

A state of low shear corresponds to the dynamic viscosity as measured by means of a Haake 6R viscometer at 6 rpm at room temperature. A state of high shear corresponds to the dynamic viscosity as measured by means of a Haake 6R viscometer at 60 rpm and room temperature.

The coating formulations of the invention comprise at least one surface-modified silicon dioxide, wherein
the viscosity of the coating formulation of the invention, as measured in a state of low shear (6 rpm) after preparation of the coating formulation with a surface-modified silicon dioxide and 1 day's storage of the completed coating formulation at 23° C. and 50% relative humidity (rh) is lower by not more than 40%, preferably no more than 20%, in particular not more than 10% than the viscosity of an identical coating formulation without a surface-modified silicon dioxide, as measured in a state of low shear (6 rpm), following preparation of the coating formulation and 1 day's storage of the completed coating formulation at 23° C. and 50% rh;
the viscosity of the coating formulation of the invention, as measured in a state of high shear (60 rpm) after preparation of the coating formulation with a surface-modified silicon dioxide and 1 day's storage of the completed coating formulation at 23° C. and 50% relative humidity (rh) is lower by not more than 25%, preferably not more than 20%, in particular not more than 10% than the viscosity of an identical coating formulation without a surface-modified silicon dioxide, as measured in a state of high shear (60 rpm), following preparation of the coating formulation and 1 day's storage of the completed coating formulation at 23° C. and 50% rh.

The coating formulations of the invention can have a thixotropic index TI 6/60≧1.5, preferably >2 or >2.4 in a thixotropic, solventborne decorating paint and preferably >1.6 in a pseudoplastically formulated aqueous dispersion-based paint, and comprise at least one surface-modified silicon dioxide with a fraction of 0.5%-15% by weight, preferably 1%-10% by weight. It is additionally possible for one or more of the following components to be included:

- 5%-99.5%, preferably 20%-80%, in particular 35%-70% by weight of a polymer component or of a mixture of two or more physically or chemically crosslinking polymer components (=binders and curing components) and/or
- 0%-80%, preferably 20%-70%, in particular 30%-55% by weight of a low molecular mass component exerting a solvent function, or of a mixture of such low molecular mass components, and/or
- 0.1%-5%, preferably 0.2%-3% by weight of associative thickeners based on modified polyurethanes (HEUR) or hydrophobically modified acrylic or methacrylic acid copolymers (HASE).

Besides the aforementioned components the coating formulations of the invention may further comprise auxiliaries customarily used in coating materials, such as plasticizers, stabilizers, phase mediators, pigments, surface-active substances, desiccants, catalysts, initiators, photosensitizers, inhibitors, light stabilizers, and preservatives, for example.

All of the aforementioned ranges of preference can be set independently of one another, ensuring that the particular properties of the coating formulations of the invention are achieved by a combination of all of the aforementioned components. The surface-modified silicon dioxides used, in particular, have an important influence over the properties of the coating formulations.

Typical coating formulations for the purposes of the invention, in which the stated advantages are observable, are thixotropically formulated, solventborne paints based on alkyd resin, and also pseudoplastically formulated, aqueous dispersion-based paints and stains based on acrylate, acrylate/polyurethane and/or hybrids thereof. With particular preference the formulations are matted coating formulations.

The coating formulations of the invention display the advantage that on exposure to low shear forces their viscosity is hardly lowered or is even—depending on the choice of the silicon dioxide—raised. This leads to improved coating properties in paints: the coating formulations of the invention can be used with a brush or roller without unwanted dripping of the paint. Additionally the coating materials of the invention adhere very well to vertical walls, thereby minimizing or eliminating the formation of "curtains."

As well as having good processing properties under low shear, the coating formulations of the invention have excellent high shear properties, since under high shear their viscosity is significantly lowered. This makes it easier, for example, to utilize the coating formulations of the invention in a spray gun.

Without wishing to be tied to any one theory, the applicant is of the view that the particular properties of the coating formulations of the invention are attributable to the fact that the thixotropic structures present in the coating material are minimally destroyed by the surface-modified silicon dioxides that are used in the coating materials of the invention. As a result, in aqueous coating systems, for example, the interaction between the thickener and the water is little affected by the surface-modified silicon dioxides. Consequently the thixotropic properties are retained.

The coating formulations of the invention may comprise as binders the resins customary in paints and coatings technology, as described for example in "*Lackharze, Chemie, Eigenschaften und Anwendungen*," edited by D. Stoye and W. Freitag, Hanser Verlag, Munich, Vienna 1996. Examples that may be mentioned include the polymers and copolymers of (meth)acrylic acid and of their esters, carrying further functional groups if desired, with other olefinically unsaturated compounds, such as styrene, for example; polyether polyols, polyester polyols, polycarbonate polyols, polyurethane polyols and epoxy resins, and also any desired mixtures of these polymers, and also fatty-acid-modified "alkyd resins" prepared by polycondensation, as described in Ullmann, $3^{rd}$ edition, volume 11, page 334 ff.

Preferred polymer components include polyacrylate, polyester, polycaprolactone, polyether, polycarbonate and polyurethane polyols and hydroxy-functional epoxy resins and also any desired mixtures of these polymers. Particularly preferred polymeric organic compounds used are aqueous or solvent-comprising or solvent-free polyacrylate polyols and polyester polyols and also any desired mixtures thereof.

Suitable polyacrylate polyols are copolymers of monomers, including monomers containing hydroxyl groups, with other olefinically unsaturated monomers, such as esters of (meth)acrylic acid, styrene, α-methylstyrene, vinyltoluene, vinyl esters, monoalkyl and dialkyl esters of maleic and fumaric acid, α-olefins, and other unsaturated oligomers and polymers. Particularly suitable polyacrylate polyols have an average, weight-averaged molecular weight, as determined by gel permeation chromatography (standard: polystyrene), of from 2000 to 100 000 g/mol, preferably from 2500 to 50 000 g/mol and more preferably from 3100 to 40 000 g/mol, a glass transition temperature TG of from −50° C. to 100° C., preferably from −40° C. to 90° C. and more preferably from −30° C. to +80° C., an acid number of <30 mg KOH/g, preferably <25 mg KOH/g, and a hydroxyl group content of from 0.5 to 14.0.

Solvents which may be present in the coating formulations of the invention include customary solvents, such as aromatic, aliphatic, araliphatic or cycloaliphatic hydrocarbons, partly or fully halogenated aromatic, aliphatic, araliphatic or cycloaliphatic hydrocarbons, alcohols such as methanol, ethanol, isopropanol, butanol, benzyl alcohol, diacetone alcohol, esters such as ethyl acetate, propyl acetate, butyl acetate, ether esters such as methoxypropyl acetate or butyl glycol acetate, ketones such as acetone, methyl ethyl ketone, methyl isobutyl ketone or cyclohexanone, strongly polar solvents such as dimethylformamide and water, and mixtures thereof.

When these solvents are used as a dispersing medium for the coating formulations of the invention, additional substances may be added. Preferred such substances are those which are also intended for use again subsequently or those which improve the deagglomeration and/or the stability of the deagglomerated materials, examples being dispersing resins or dispersing additives. Preference is given to the oligomeric or polymeric organic compounds, such as the resins and binders listed above that are customary in paints and coatings technology, for example.

As thickeners with an associative action the coating formulations of the invention may comprise hydrophobically modified (meth)acrylic acid copolymers (HASE=Hydrophobically modified Alkali-Swellable Emulsions). These products may be composed chemically of three blocks:

a) hydrophobic monomers, e.g., acrylic acid, methacrylic acid, maleic anhydride b) hydrophobic monomers, e.g., ethyl acrylate, butyl acrylate, and also methyl methacrylate, butyl methacrylate and isobutyl methacrylate c) associative monomers, e.g., methyl vinyl ethers of at least eight carbon atoms.

In addition, polyurethane thickeners (HEUR=hydrophobically modified ethyleneoxide-urethane) may be incorporated into the coating formulations of the invention for the purpose of developing a strongly pseudoplastic (thixotropic) viscosity. These synthetic thickeners are based on water-soluble polyurethanes having a relatively low molar weight of about 8000-70,000 g/mol. The polyurethane polymers are produced by reacting diisocyanates with diols and hydrophobic blocking components. Possible hydrophobic blocking components can be those such as: oleyl, stearyl, dodecylpropyl, octadecyl, hexadecyl and nonylphenyl. Polyurethane thickeners of this kind may have both a linear polymer structure and a comb-shaped polymer structure.

The hydrophilic segments of the associative thickeners are generally polyethers or polyesters. By way of example, mention is made here of polyesters of maleic acid and ethylene glycol, and also of polyethers, such as polyethylene glycol or polyethylene glycol derivatives. Possible diisocyanates are, for example, isophorone diisocyanate (IPDI), toluene diisocyanate (TDI) and hexamethylene diisocyanate (HMD).

As a further constituent, the coating formulations of the invention comprise special surface-modified silicon dioxides. These silicon dioxides are precipitated silicas, pyrogenic silicas, silica gels or silicas prepared from pyrogenic silicas, the surface of which has been modified with polymers. The choice of suitable surface-modified silica depends upon the desired properties of the coating formulation.

Preference is therefore given to coating formulations which comprise at least one silicon dioxide whose surface has been treated with at least one polyorganosiloxane and/or modified polyorganosiloxane. The silicon dioxides in question are in particular those whose surface has been modified with polyether- and acrylate- and/or polyacrylate-modified polyorganosiloxanes or polyalkoxysiloxanes.

In one preferred embodiment the coating formulation of the invention comprises at least one silicon dioxide whose surface has been modified with polyorganosiloxanes having the following general structure

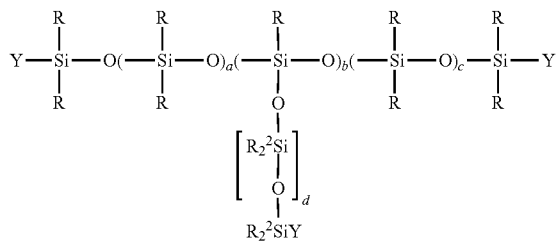

where
Y = -OH, -OR or
Y = H$_5$C$_2$—O—(C$_2$H$_4$O)$_m$-, H$_7$C$_3$—O—(C$_3$H$_6$O)$_m$- or
Y = R$_2$C=C—(CH$_2$—CH)$_k$-,
       |        |
       R$^4$   COOR$^3$
R = -alkyl, especially methyl or ethyl,
R$^2$ = alkyl or H,
R$^3$ = alkyl,
R$^4$ = H or alkyl,
a = 0-100, b = 0-100, c = 0-100, d = 0-100,
m = 0-100 and k = 0-100.

In a further preferred embodiment the coating formulation of the invention comprises at least one silicon dioxide whose surface has been modified with polyorganosiloxanes having the following general structure:

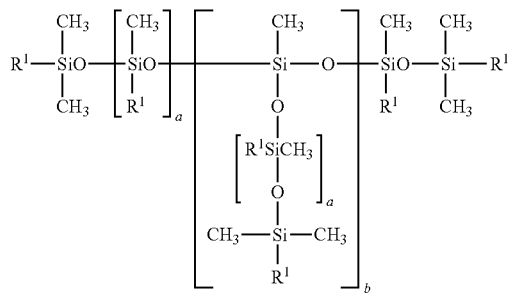

where
R$^1$ = a methyl radical or
R$^1$ = (CH$_3$)$_2$CHCOCH$_2$C(CH$_3$)$_2$CHCH(CH$_3$)$_2$
              ‖                    |
              O                    O
                                   |
and/or
R$^1$ = (CH$_3$)$_2$CHCOCHC(CH$_3$)$_2$CH$_2$O—
              ‖   |
              O  CH—CH$_3$
                  |
                  CH$_3$ and the sum of the units a=0 to 100, the sum of the units b=0 to 15, the ratio of methyl to alkoxy radicals among the radicals R$^1$ is smaller than 50:1 and b is >1 if a=0, and a is >5 if b=0. Further details, in particular on the preparation of these polyorganosiloxanes, can be found in DE 36 27 782 A1 the content of which is hereby incorporated by reference. In connection with the aforementioned polyorganosiloxanes, alkyl radicals are to be understood as being straight-chain or branched-chain alkyl radicals having 1 to 100 carbon atoms, preferably 1 to 25, more preferably 1 to 10 carbon atoms, and also cycloalkyl radicals having 1 to 15 carbon atoms. The alkyl radicals may contain one or more double or triple bonds, and individual atoms may be replaced by heteroatoms such as O, N or S.

The surface-modified silicon dioxides used in the coating formulations of the invention may independently of one another have one or more of the following physicochemical parameters:

| | |
|---|---|
| Carbon content: | 0.5-30%, preferably 1-20%, in particular 2-10% |
| DBP (anhydrous): | 100-600 g/100 g, preferably 200-450 g/100 g, in particular 250-380 g/100 g |
| Mean particle size d$_{50}$: | 0.5-50 μm, preferably 1-30 μm, in particular 2-20 μm |
| pH: | <8 |

The surface-modified silicon dioxides described above and comprised in the coating formulations of the invention may be prepared by surface-treating commercially available silicon dioxides, or silicon dioxides preparable by known methods, with the aforementioned polymers. This surface treatment may take place in accordance with techniques that are known.

It is possible, for example, to mix commercially available silicon dioxides, e.g., matting agents from Grace (SYLOID® ED 2, SYLOID® ED 3, SYLOID® ED 5, SYLOID® C 805, SYLOID® C 807, SYLOID® C 809, SYLOID® C 812), matting agents from INEOS® (HP 260, HP 270, HP 285, HP 39, HP 395) or matting agents from SYLYSIA® (SYLYSIA®350, SYLYSIA® 370, SYLYSIA® 270) or matting agents from Degussa AG, with one of the aforementioned polymers and to carry out the surface modification at room temperature or elevated temperature.

Additionally it is possible to carry out the surface modification of the silica with the polymer during the preparation of the silica. Thus the polymer can, for example, be added to the precipitation suspension of the silicon dioxide. It is, however, also possible to spray in the silicon dioxide together with the polymer in a spray dryer and to carry out the surface modification in the course of drying. Finally it is also possible to carry out the surface modification of the silicon dioxide after drying—for example, during the grinding of the silica. As already stated, methods of modifying silicon dioxides are known to the skilled worker, or known methods can be easily modified by the use of the corresponding polymers. Accordingly the method variants recited are not complete. It is possible to carry out the surface modification by further methods. Details of surface modification methods which can be employed are found in EP 1 281 733 A1, the contents of which is hereby incorporated by reference.

Particularly preferred surface-modified silicon dioxides are described in PCT/EP03/12380 and also in the German patent application number 0 2004 012 090.0 the content of which is hereby incorporated by reference.

The coating formulations of the invention are preferably used as architectural paints for coating parts of buildings, windows and door frames.

Measurement Methods

The physicochemical data of the coating formulations of the invention and of the silicon dioxide samples employed in them are determined using the following methods:

Determination of Tapped Density

The tapped density is determined in a method based on DIN EN ISO 787-11. A defined amount of a sample which has not been sieved beforehand is introduced into a graduated glass cylinder and subjected to a fixed number of jolts by means of a jolting volumeter. The jolting is accompanied by compaction of the sample. The result of the analysis conducted is the tapped density.

The measurements are carried out on a jolting volumeter with counter from Engelsmann, Ludwigshafen, Type STAV 2003.

First of all a 250 ml glass cylinder is tared on a precision balance. Then 250 ml of the silicon dioxide are introduced with the aid of a powder funnel into the tared graduated cylinder in such a way that no cavities are formed. Subsequently the sample quantity is weighed to an accuracy of 0.01 g. Thereafter the cylinder is tapped lightly so that the surface of the powder in the cylinder is horizontal. The graduated cylinder is inserted into the corresponding holder on the jolting volumeter and jolted 1250 times. The volume of the jolted sample is read off to an accuracy of 1 ml after one jolting run.

The tapped density D(t) is calculated as follows:

$$D(t)=m*1000/V$$

D(t): tapped density [g/l]
V: volume of the silicon dioxide after jolting [ml]
m: mass of the silicon dioxide [g]

Determination of Loss on Drying (LD)

The moisture content or loss on drying (LD) of silicon dioxide is determined by a method based on ISO 787-2 after 2-hour drying at 105° C. This loss on drying is accounted for predominantly by water.

10 g of the pulverulent silicon dioxide are weighed to an accuracy of 0.1 mg (initial mass E) into a dry glass beaker on a precision balance (Sartorius LC621S). The glass beaker is covered with aluminum foil into which a number of holes (Ø1 mm) have been drilled. The glass beaker covered in this way is dried in a drying oven at 105° C. for 2 h. Thereafter the hot glass beaker is cooled to room temperature in a desiccator over desiccants for at least one hour.

In order to determine the final mass A, the glass beaker is weighed to an accuracy of 0.1 mg on the precision balance. The moisture content (LD) in % is determined in accordance with $$LD=(1-A/E)*100,$$

where A=final mass in g and E=initial mass in g.

Determination of Loss on Ignition (LOI)

According to this method the weight loss of silicon dioxide is determined in a method based on DIN EN ISO 3262-1 at 1000° C. At this temperature physically and chemically bound water and other volatile constituents escape. The moisture content (LD) of the sample investigated is determined by the above-described method "Determination of loss on drying" based on DIN EN ISO 787-2.

0.5 g of the silicon dioxide is weighed to an accuracy of 0.1 mg (initial mass E) into a tared porcelain crucible which has been calcined beforehand. The sample is heated in a muffle furnace at 1000±50° C. for 2 h. The porcelain crucible is subsequently cooled to room temperature in a desiccator cabinet with silica gel as desiccant. The final mass A is determined gravimetrically.

The loss on ignition LOI in % is obtained in accordance with $$LOI=(1-A/F)*100.$$

F is the corrected initial mass, based on dried matter, in g, and is calculated according to $$F=E*(1-LD/100).$$

In the calculations A=final mass in g, E=initial mass in g, and LD=loss on drying in %.

Determination of Carbon Content (C %)

The carbon content of silicon dioxide is determined using the C-mat 500 (Ströhlein Instruments). The samples are heat treated at about 1350° C. and the carbon is oxidized to $CO_2$ by a stream of oxygen. The $CO_2$ is measured in an infrared cell.

In the measurements a distinction is made as to whether the carbon content is greater than or less than 1 percent. If the carbon content of the homogeneous silica samples is above 1 percent, measurement is carried out in the "high" range of the instrument; if it is below 1 percent, measurement takes place in the "low" range.

First of all the control sample is measured. For that purpose 0.14-0.18 g of the control sample is weighed out on an analytical balance into a porcelain boat purified by calcining and cooled to room temperature. When the start button is operated the weight is carried over, since the balance is coupled with the C-mat. The boat must be pushed into the middle of the combustion tube within 30 seconds. When combustion is at an end the measurement is converted into pulses and is evaluated by the computer. At least 3 determinations (depending on matched values) are carried out. If appropriate it is necessary to readjust the factor of the instrument (for details see operating instructions for C-mat 500, Ströhlein Instruments). This factor is calculated according to the following formula:

$$\text{factor} = \frac{\text{setpoint (standard)} * \text{initial mass (standard) in g} * 10^8}{\text{pulses}}$$

Subsequently the silicon dioxide samples are measured. The initial mass is 0.04-0.05 g. The porcelain boat is covered with a porcelain lid. In the event of deviations >0.005% a greater number of measurements are carried out and the average is calculated.

The C-mat 500 is operated in accordance with the operating instructions from Ströhlein Instruments.

The carbon content is calculated as follows and expressed in the unit %:

$$\text{Carbon content} = (1*F*10^{-8})/E$$

1=pulse
F=factor
E=initial mass in g

Determination of pH

The method, based on DIN EN ISO 787-9, is used for determining the pH of an aqueous suspension of silicon dioxides at 20° C.

Prior to pH measurement the pH meter (Knick, Type: 766 pH meter Calimatic with temperature sensor) and the pH electrode (Schott, N7680 combination electrode) must be calibrated, using the buffer solutions, at 20° C. The calibration function is to be chosen such that the two buffer solutions used include the expected pH of the sample (buffer solutions of pH 4.00 and 7.00, pH 7.00 and pH 9.00, and, if appropriate, pH 7.00 and 12.00).

5.00 g of the pulverulent silicon dioxide with a moisture content of 4±2% are weighed to an accuracy of 0.01 g on a precision balance into a wide-necked glass bottle which has been tared beforehand. The suspension is made up to the 100 ml mark using cold, deionized water at a temperature of 20° C. If the samples under investigation are not sufficiently wettable by water, then the suspension is made up to the 100 ml mark using 50.0 ml of analytical-grade methanol and 50.0 ml of deionized water.

Subsequently the suspension is shaken in the sealed vessel for a period of 5 minutes using a shaker machine (Gerhardt, Model LS10, 55 W, level 7) at 20° C. The pH is measured directly thereafter. For the measurement the electrode is rinsed first with deionized water and then with a portion of the suspension, and then is immersed into the suspension. A magnetic stirrer bar is then added to the suspension, and the pH measurement is carried out at constant stirring speed, with a slight vortex being formed in the suspension. When the pH meter displays a constant value the pH is read off on the display.

Determination of DBP Absorption (DBP)

The DBP absorption (DBP number), which is a measure of the absorbency of silicon dioxides, is determined by a method based on standard DIN 53601, as follows:

12.50 g of the pulverulent silicon dioxide (moisture content 4±2%) are introduced into the kneader chamber (article number 279061) of the Brabender absorptometer "E" (without damping of the outlet filter of the torque sensor). With continuous mixing (kneader paddles rotating at a speed of 125 rpm) dibutyl phthalate is added dropwise to the mixture at a rate of 4 ml/min at room temperature by means of the Brabender T90/50 Dosimat. Its incorporation by mixing takes place with only a small amount of force, and is monitored by means of the digital display. Toward the end of the determination the mixture becomes pasty, which is indicated by a sharp increase in the required force. At a display reading of 600 digits (torque of 0.6 Nm) an electrical contact shuts off both the kneader and the DBP feed. The synchronous motor for the DBP feed is coupled to a digital counter, so that the consumption of DBP in ml can be read off.

The DBP absorption is reported in g/100 g and is calculated using the following formula:

$$DBP = \frac{V*D*100}{E} * \frac{g}{100\ g} + K$$

where DBP=DBP absorption in g/100 g
V=consumption of DBP in ml
D=density of DBP in g/ml (1.047 g/ml at 20° C.)
E=initial mass of silicon dioxide in g
K=correction value as per moisture correction table, in g/100 g The DBP absorption is defined for anhydrous, dried silicon dioxides. When moist silicon dioxides are used it is necessary to take into account the correction value K for calculating the DBP absorption. This value can be determined using the moisture correction table; for example, silicon dioxide having a water content of 5.8% would mean an addition of 33 g/100 g for the DBP absorption. The moisture content of the silicon dioxides is determined in accordance with the "Determination of loss on drying" method described.

Moisture correction table for dibutyl phthalate absorption—anhydrous

| % water | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of Viscosity of Paints and Stains

The addition of silicon dioxides to a paint may influence its viscosity. The paint under investigation is prepared in accordance with the respective preparation instructions. After an appropriate storage time (1 day, 10 days and/or 14 days) 80 ml of the paint are introduced into a 100 ml container (diameter 45 mm). The paint is left for about 2 h for devolatilization. Shortly before the beginning of the measurement the viscometer (Haake Viscometer $6^R$) is switched on, the self-test is carried out, and spindle size and rotational speed are set on the instrument. For determining the dynamic viscosity of the paint the following settings are chosen:

| Setting | Amount of paint | Container size/diameter | Spindle size | Rotational speed |
|---|---|---|---|---|
| 1 | 80 ml | 100 ml/45 mm | R 6 | 6 rpm |
| 2 | 80 ml | 100 ml/45 mm | R 6 | 60 rpm |

The spindle (R6) is inserted on the viscometer and immersed in the paint up to the mark on the spindle shaft. The viscometer is started. The spindle is left to rotate in the paint for 2 minutes and then the measurement for setting 1) is read off. Thereafter the spindle is rotated in the paint for 2 minutes more, and finally the measurement for setting 2 is read off. The preparations and the measurement are carried out at 23° C. and 50% rh. The thixotropic index TI 6/60 is calculated as follows:

$$TI\ 6/60 = \frac{\text{dynamic viscosity at 6 } rpm}{\text{dynamic viscosity at 60 } rpm}$$

Determination of 60° and 85° Reflectometer Value

The effect exerted on the reflectance as a result of deliberate roughening of paint film surfaces is the outstanding property of matting agents based on $SiO_2$. The reflectometer value is therefore an important criterion for characterizing matted paint films.

A prerequisite for the measurement is that the paint film surfaces to be measured be planar, clean and cured.

The measurement is carried out on at least 3 representative sites on the sample by means of a reflectometer with measuring geometry according to DIN 67530 (e.g., Haze-gloss, BYK Instruments). If the individual measurements deviate from one another too greatly, then generally a further measurement should be carried out at representative sites, or the number of individual measurements should be increased to >3. On the BYK haze-gloss the display shows the standard deviation of the measurements. If the standard deviation s is >0.5 it is advisable to carry out the aforementioned measures. The mean value shall be reported to 1 decimal place.

In the characterization of matted paint film surfaces it has been found appropriate to carry out measurements with the 60° and the 85° measuring geometries. In deviation from DIN 67530, therefore, the reflectometer values of matted paint film surfaces are determined using both measuring geometries.

EXAMPLES

The examples which follow are intended to illustrate the invention without restricting its scope. For the performance investigations described below the following silicon dioxides are used:

Prior Art Silicon Dioxides:

| silicon dioxide 1: | Acematt TS 100 (Degussa AG) |
| silicon dioxide 2: | Acematt HK 400 (Degussa AG) |
| silicon dioxide 3: | Acematt OK 412 (Degussa AG) |

Surface-Modified Silicon Dioxides of the Invention
silicon dioxide 4:
is prepared from the hydrophilic pyrogenic silica (Aerosil 300®) having the following physicochemical properties:

| BET specific surface area [m²/g]: | 290.0 |
| pH: | 4.2 |
| tapped density [g/l]: | 35 |
| loss on drying [%]: | 0.8 |
| DBP, anhydrous [g/100 g]: | 305.0 |
| C content [%]: | 0 | and from the coating agent (TEGO Foamex 845, TEGO GmbH), a polysiloxane emulsion, which has the following physicochemical properties:

| Form: | thixotropic liquid |
| Color: | white |
| Odor: | slight inherent odor |
| Boiling temperature: | about 100° C. |
| Density: | about 1 g/cm³ (at 20° C.) |
| Water solubility: | miscible |
| pH: | 5-8 (at 20° C. in original state) |

The coating agent (TEGO Foamex 845, TEGO GmbH) consists of 656.4 g of an aqueous polysiloxane emulsion which is diluted with 210 g of water. The pH of the coating agent is adjusted to 11.3 by adding NH$_4$OH. 0.865 kg of coating agent is sprayed at room temperature, using a dual-fluid nozzle, onto 2 kg of the pyrogenic silica. The mixing vessel used is a plowshare mixer. The loss on drying of the material thus moistened is 24.4%.

The moistened material is ground in a gas jet mill (throughput: 7 kg/h) and subsequently dried at 120° C. for 13 h.
Silicon dioxides 5 and 6:
are prepared as follows:

A precipitated silica is prepared by the method of DE 1 767 332. For that purpose a heatable 120 l precipitation vessel with stirrer unit is charged with 80 l of water, which is adjusted to an alkali number of 20 using 5.5 l of waterglass (density=1.346 g/l, SiO$_2$ content=27.3%, Na$_2$O content=7.9%). The initial charge is heated to 85° C. At this temperature the entire precipitation is carried out. Thereafter, in parallel, waterglass is metered in at a rate of 207 ml/min, and sulfuric acid (50%) at a rate of 45 ml/min, the metered additions being made such that the alkali number does not change. From the 30$^{th}$ minute onward a shear unit is brought in, and shears the precipitation suspension in the course of further precipitation with an intensity such that at the end of precipitation a particle distribution of d50=7 μm is achieved. After the 45$^{th}$ minute the metered addition of waterglass and sulfuric acid is interrupted for 30 minutes. Then waterglass and sulfuric acid are reconnected and added at the same rate as above. After a further 45 minutes the addition of waterglass is turned off and sulfuric acid is metered in until a pH of 3.5 is reached. Thereafter the precipitation is at an end.

Subsequently 1.25 kg (silicon dioxide 5) or 2.5 kg (silicon dioxide 6) of polyorganosiloxane emulsion (TEGO Foamex 845, TEGO GmbH) are added all at once to the silica suspension and this suspension is subsequently stirred at an elevated temperature of 60° C. for a period of 30 minutes. Thereafter the silica thus coated, as per DE 17 67 332, is filtered off, washed, dried, ground and classified.

Silicon dioxides 1-6 have the physicochemical parameters set out in Table 1 as follows:

TABLE 1

| | organ. mod. | Tapped density g/l | LD % | LOI % | C % | pH | DBP (anhydrous) g/100 g |
|---|---|---|---|---|---|---|---|
| Silicon dioxide 1 (prior art) | — | 39 | 2.3 | 2.4 | 0 | 6.2 | 397 |
| Silicon dioxide 2 (prior art) | — | 134 | 6.2 | 4.5 | — | 6.4 | 275 |
| Silicon dioxide 3 (prior art) | PE wax | 136 | 4.7 | 10.8 | 5.2 | 6.1 | 265 |
| Silicon dioxide 4 (inventive) | polysiloxane | 24 | 1.6 | 4.9 | 3.0 | 6.5 | 341[1] |
| Silicon dioxide 5 (inventive) | polysiloxane | 129 | 4.1 | 5.5 | 2.1 | 6.3 | 288 |
| Silicon dioxide 6 (inventive) | polysiloxane | 131 | 3.5 | 10.2 | 6.3 | 7.5 | 278 |

[1] DBP (original state) = 326 g/100 g

Example 1

Performance Results in a Thixotropically Formulated Solventborne Decorating Paint A paint is produced in accordance with formula 1. The raw materials of items 1 to 4 are charged to a 5 l stainless steel container and dispersed using a dissolver disc (diameter 75 mm) at 2000 rpm for 5 minutes. Then items 5 and 6 are added. Dispersion is carried out again with the same settings. Item 7 is added and dispersion takes place as before, giving a homogeneous mixture. The paint is then left for devolatilization.

100 g of the paint batch prepared above are transferred to a 350 ml PE beaker and the silicon dioxide is added. Using a dissolver (diameter 45 mm) which is customary and common place in the paint industry the silicon dioxide is stirred into the paint at 2000 rpm for 5 minutes. The concentration of silicon dioxide (item 8) is held constant for all examples at 15% by weight based on binder solids (items 1 and 2). After the silicon dioxide has been stirred in, the paint is stored for 1 day or 10 days at 23° C. and 50% rh and then the viscosity is determined at 6 and 60 rpm. The results are summarized in Table 2.

Formula 1:

| Item No. | | Weight fractions in % |
|---|---|---|
| 1 | Super Gelkyd 6006 WDA 55 (polyamide-modified alkyd resin), 55% in white spirit (Cray Valley, product data sheet of 11/2002) | 25.0 |
| 2 | Synolac 6005 WD 65 (fatty-acid-modified long-oil alkyd), 65% in white spirit (Cray Valley, product data sheet of 10/2003) | 55.5 |
| 3 | Exxsol D 60 (Exxon Mobil Chemical, product data sheet of 07/2003) | 8.5 |
| 4 | Exxsol D 40 (Exxon Mobil Chemical, product data sheet of 07/2003) | 8.5 |
| 5 | Soya lecithin STA, 50% in white spirit (Lubrizol, edition 01/02) | 1.4 |
| 6 | Borchinox M 2 (antiskinning agent, Borchers, product data sheet of 12.12.2002) | 0.7 |
| 7 | Soligen calcium (siccative, Borchers, product data sheet of 22.10.2003) | 1.4 |
| | Total | 100.0 |
| 8 | Silicon dioxide | 5.4 |

In the coating systems of the invention the desire is that the addition of surface-modified silicon dioxides should lower the viscosity as little as possible as compared with the coating formulation without silicon dioxide. An increase in the viscosity may be of benefit, since it has a positive influence on the flow behavior following application.

Table 2 shows that the viscosity of the coating formulations of the invention is not lowered in comparison to the identical coating formulation without silicon dioxide. In contrast, the prior art coating formulation which comprises a silica surface-modified with PE wax exhibits a markedly lowered viscosity compared to the coating formulation without silicon dioxide. The high thixotropic index of the inventive examples show that the requirement of thixotropic or pseudoplastic coating materials, namely to be as highly mobile as possible under high shear load is met by the coating formulations of the invention.

Example 2

Performance Results in a Pseudoplastically Formulated Aqueous Dispersion-Based Stain A dispersion-based stain is prepared in accordance with formula 2.

Formula 2

| Item No. | | Parts by weight |
|---|---|---|
| 1 | NeoPac E-140 (NeoResins, product data sheet of Jan. 01, 1995) | 92.0 |
| 2 | Dowanol DPM (Dow, product data sheet of 03/2004) | 4.5 |
| 3 | Tego Foamex 822 (Tego GmbH, product data sheet of 01/2004) | 0.6 |
| 4 | Borchigel L-75N 1:1 in water (Borchers, product data sheet of Dec. 12, 2002) | 1.8 |
| 5 | Viscalex VG 2 1:1 DI water pH 5.7 (Ciba Speciality Chemicals, Version 2 of Apr. 27, 2004) | 0.6 |

TABLE 2

| Coating formulation with | Coating agent for SiO$_2$ | Viscosity [mPas] after 1 day, measured at | | | Viscosity [mPas] after 10 days, measured at | | |
|---|---|---|---|---|---|---|---|
| | | 6 rpm | 60 rpm | TI 6/60 | 6 rpm | 60 rpm | TI 6/60 |
| Silicon dioxide 3 (prior art) | PE wax | 5300 | 2800 | 1.89 | 6600 | 3100 | 2.13 |
| Silicon dioxide 4 (inventive) | polysiloxane | 23100 | 7600 | 3.04 | 25400 | 8700 | 2.92 |
| Silicon dioxide 5 (inventive) | polysiloxane | 8200 | 3700 | 2.22 | 12400 | 4700 | 2.63 |
| Silicon dioxide 6 (inventive) | polysiloxane | 9500 | 3900 | 2.44 | 13700 | 4400 | 3.12 |
| Without silicon dioxide | | 8100 | 2600 | 3.12 | 8100 | 2900 | 2.79 |

-continued

| Item No. | | Parts by weight |
|---|---|---|
| 6 | Tego Glide 410 (Tego GmbH, product data sheet of 01/2004) | 0.5 |
| Total | | 100.0 |
| 7 | Silicon dioxide | 1.5 |
| Total | | 101.5 |

Items 2-6 are added in order to the initial binder charge (item 1) with stirring and the components are mixed homogeneously. Subsequently the silicon dioxide is incorporated into this mixture with dispersing using a paddle stirrer (disc Ø45 mm) and dispersion is carried out at 2000 rpm for 10 minutes.

On the basis of formula 2, 1.5 parts by weight of silicon dioxide are stirred in and dispersed at 2000 rpm with the paddle stirrer for 10 minutes. The batches are measured after 1 day and after 14 days of storage at 23° C., using the Haake RV 6, spindle 4, at 6 and 60 rpm, and the thixotropic index TI 6/60 is determined (Table 3). The 60° and 85° reflectometer values are determined using the coating-material batches following storage, after the silicon dioxide has been incorporated, for 1 day at 23° C. and 50% rh.

The measurement of viscosity after 1 d shows (Table 3) that the coating formulations of the invention which comprise surface-modified silicon dioxides (silicon dioxide 4-6), in both a state of high shear and a state of low shear, have only a little influence on the viscosity of the coating formulation. In the state of low shear the viscosity is lowered by 0 to 36%, whereas the comparative examples influence the viscosity of the coating formulation drastically (a lowering of up to 76%).

The thixotropic indices of the coating formulations of the invention and those of the comparative examples are within the same order of magnitude. However, the absolute values of the viscosity in the state of low shear for the inventive samples are substantially higher than those of the coating formulations which comprise the comparative examples. This shows that only the coating formulations of the invention meet the requirements imposed on thixotropic or pseudoplastic coating formulations, namely to affect the viscosity of the thixotropic or pseudoplastic coating formulation as little as possible in a state both of low shear and of high shear.

It is known that the viscosity of coating formulations into which the silicon dioxides are incorporated as matting agents may decrease over time. The values of the viscosity measurements in Table 3, measured after 14 d, show that in the case of the comparative examples this decrease is substantially higher than in the case of the inventive coating formulations.

Table 4 compares the 60° and 85° reflectometer values of the coating formulations of the invention and of the comparative examples, determined on coating formulations stored, following addition of the silicon dioxide, for 1 day at 23° C. and 50% rh. The figures show that the coating formulations of the invention have a matting effect comparable with that of the comparative examples.

TABLE 3

| Coating formulation with | Coating agent for SiO$_2$ | Viscosity [in mPas] after 1 day, measured at | | | | | Viscosity [in mPas] after 14 days, measured at | | | | |
|---|---|---|---|---|---|---|---|---|---|---|---|
| | | 6 rpm | %[3] | 60 rpm | %[3] | TI 6/60 | 6 rpm | %[4] | 60 rpm | %[4] | TI 6/60 |
| Silicon dioxide 1[1] | — | 6000 | 76 | 3800 | 70 | 1.58 | 4360 | 27 | 2090 | 45 | 2.09 |
| Silicon dioxide 2[1] | — | 16600 | 35 | 8900 | 31 | 1.87 | 7600 | 54 | 3900 | 56 | 1.95 |
| Silicon dioxide 3[1] | PE wax | 9600 | 62 | 5900 | 54 | 1.63 | 5740 | 40 | 2490 | 58 | 2.31 |
| Silicon dioxide 4[2] | polysiloxane | 25900 | −2 | 12300 | 4 | 2.11 | 20320 | 22 | 10930 | 11 | 1.86 |
| Silicon dioxide 5[2] | polysiloxane | 18350 | 28 | 11410 | 11 | 1.61 | 11940 | 35 | 6260 | 45 | 1.91 |
| Silicon dioxide 6[2] | polysiloxane | 16150 | 36 | 10200 | 20 | 1.58 | 10010 | 38 | 6370 | 38 | 1.57 |
| Without silicon dioxide | | 25400 | 0 | 12800 | 0 | 1.98 | n.d. | | n.d. | | | n.d. = not determined
[1] Prior art
[2] Inventive
[3] Percentage deviation from the absolute value of the viscosity of the coating formulation without silicon dioxide under equal shear
[4] Percentage deviation of the absolute value of the viscosity after 1 d in the case of coating formulation with the same silicon dioxide.

TABLE 4

| | Coating agent for SiO$_2$ | 60° reflectometer value | 85° reflectometer value |
|---|---|---|---|
| Silicon dioxide 1 (prior art) | — | 18.2 | 42.9 |
| Silicon dioxide 2 (prior art) | — | 18.5 | 43.1 |
| Silicon dioxide 3 (prior art) | PE wax | 18.7 | 43.4 |
| Silicon dioxide 4 (inventive) | polysiloxane | 20.4 | 48.5 |
| Silicon dioxide 5 (inventive) | polysiloxane | 18.7 | 47.7 |
| Silicon dioxide 6 (inventive) | polysiloxane | 19.9 | 52.9 |

Obviously, numerous modifications and variations of the present invention are possible in light of the above teachings. It is, therefore, to be understood that within the scope of the appended claims, the invention may be practiced otherwise than as specifically described herein.

What is claimed is:
1. A coating formulation, comprising:
(1) 5%-99.5% by weight of solids of a polymer component or a mixture of two or more physically or chemically crosslinking polymer components;

(2) 0.5-15% by weight of solids of at least one silicon dioxide surface modified with a moiety selected from the group consisting of a polyorganosiloxane, a modified polyorganosiloxane, and a combination thereof; and
(3) 0%-80% by weight of at least one solvent or dispersing medium;
wherein:
the coating formulation is a matted thixotropic coating formulation, a pseudoplastic coating formulation, or a combination thereof;
the viscosity of the coating formulation as measured in a state of low shear (6 rpm) after preparation with the surface-modified silicon dioxide and 1 day's storage of the preparation at 23° C. and 50% relative humidity (rh) is lower by not more than 40% than the viscosity of an otherwise identical coating formulation without a surface-modified silicon dioxide, as measured in a state of low shear (6 rpm), following preparation of the otherwise identical coating formulation and 1 day's storage thereof at 23° C. and 50% rh;
the viscosity of the coating formulation as measured in a state of high shear (60 rpm) after preparation with a surface-modified silicon dioxide and 1 day's storage of the preparation at 23° C. and 50% relative humidity (rh) is lower by not more than 25% than the viscosity of an otherwise identical coating formulation without a surface-modified silicon dioxide, as measured in a state of high shear (60 rpm), following preparation of the otherwise identical coating formulation and 1 day's storage thereof at 23° C. and 50% rh;
the at least one silicon dioxide surface modified with a polyorganosiloxane, a modified polyorganoxiloxane, or a combination thereof is surface modified with a polyether-modified polyorganosiloxane, a (meth)acrylate-modified polyorganosiloxane, or a poly(meth)acrylate-modified polyorganosiloxane having the following general structure:

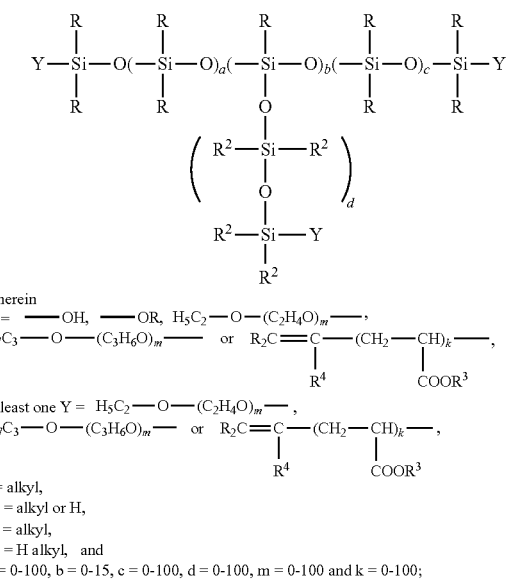

wherein
Y = —OH, —OR, $H_5C_2$—O—$(C_2H_4O)_m$—,
$H_7C_3$—O—$(C_3H_6O)_m$— or $R_2C$=C—$(CH_2$—$CH)_k$—,
                                    |         |
                                    $R^4$    $COOR^3$ at least one Y = $H_5C_2$—O—$(C_2H_4O)_m$—,
$H_7C_3$—O—$(C_3H_6O)_m$— or $R_2C$=C—$(CH_2$—$CH)_k$—,
                                    |         |
                                    $R^4$    $COOR^3$ R = alkyl,
$R^2$ = alkyl or H,
$R^3$ = alkyl,
$R^4$ = H alkyl, and
a = 0-100, b = 0-15, c = 0-100, d = 0-100, m = 0-100 and k = 0-100;

the coating formulation comprises at least one surface-modified silicon dioxide having a DBP (anhydrous) of 100-600 g/100 g; and
the at least one silicon dioxide surface modified with a moiety selected from the group consisting of a polyorganosiloxane, a modified polyorganosiloxane, and a combination thereof has a carbon content of 0.5-30%.

2. The coating formulation as claimed in claim 1, wherein said coating formulation is a matted thixotropic coating formulation, and wherein the matted thixotropic coating formulation comprises solvent and is based on alkyd resin.

3. The coating formulation as claimed in claim 1, wherein said coating formulation is a pseudoplastic coating formulation, and wherein the pseudoplastic coating formulation is an aqueous dispersion-based paint or stain based on acrylate, acrylate/polyurethane and/or hybrids thereof.

4. The coating formulation as claimed in claim 1, comprising at least one surface-modified precipitated silica alone or in a mixture with other surface-modified silicon-dioxides.

5. The coating formulation as claimed in claim 1, comprising at least one surface-modified pyrogenic silica alone or in a mixture with other surface-modified silicon dioxides.

6. The coating formulation as claimed in claim 1, comprising at least one surface-modified silica gel alone or in a mixture with other surface-modified silicon dioxides.

7. The coating formulation as claimed in claim 1, comprising at least one surface-modified silicon dioxide having a mean particle size $d_{50}$ of 0.5-50 μm.

8. The coating formulation as claimed in claim 1, comprising 0.1-5% by weight of associative thickeners based on modified polyurethanes (HEUR) or on hydrophobically modified acrylic or methacrylic acid copolymers.

9. The coating formulation as claimed in claim 1, comprising a polymer component or a mixture of two or more physically or chemically crosslinking polymer components is selected from the group consisting of polymers and copolymers of (meth)acrylic acid and its esters, optionally carrying further functional groups, with other olefinically unsaturated compounds, polyether polyols, polyester polyols, polycarbonate polyols, polyurethane polyols, epoxy resins, fatty-acid-modified alkyd resins prepared by polycondensation and mixtures thereof.

10. The coating formulation as claimed in claim 1, wherein R is methyl or ethyl.

11. The coating formulation as claimed in claim 1, comprising at least one surface-modified silicon dioxide having a DBP (anhydrous) of 200-450 g/100 g.

12. The coating formulation as claimed in claim 1, comprising at least one surface-modified silicon dioxide having a DBP (anhydrous) of 250-380 g/100 g.

13. The coating formulation as claimed in claim 1, comprising at least one surface-modified silicon dioxide having a mean particle size $d_{50}$ of 1-30 μm.

14. The coating formulation as claimed in claim 1, comprising at least one surface-modified silicon dioxide having a mean particle size $d_{50}$ of 2-20 μm.

15. The coating formulation of claim 1, wherein the lacquer comprises 20%-80% by weight of a solvent.

16. The coating formulation of claim 1, wherein the at least one silicon dioxide surface modified with a moiety selected from the group consisting of a polyorganosiloxane, a modified polyorganosiloxane, and a combination thereof has a carbon content of 2-20%.

17. The coating formulation of claim 1, wherein the at least one silicon dioxide surface modified with a moiety selected from the group consisting of a polyorganosiloxane, a modified polyorganosiloxane, and a combination thereof has a carbon content of 3-10%.

18. A coating formulation, comprising:
(1) 5%-99.5% by weight of solids of a polymer component or a mixture of two or more physically or chemically crosslinking polymer components;
(2) 0.5-15% by weight of solids of at least one silicon dioxide surface modified with a moiety selected from the group consisting of a polyorganosiloxane, a modified polyorganosiloxane, and a combination thereof; and
(3) 0%-80% by weight of at least one solvent or dispersing medium;

wherein:
the coating formulation is a matted thixotropic coating formulation, a pseudoplastic coating formulation, or a combination thereof;
the viscosity of the coating formulation as measured in a state of low shear (6 rpm) after preparation with the surface-modified silicon dioxide and 1 day's storage of the preparation at 23° C. and 50% relative humidity (rh) is lower by not more than 40% than the viscosity of an otherwise identical coating formulation without a surface-modified silicon dioxide, as measured in a state of low shear (6 rpm), following preparation of the otherwise identical coating formulation and 1 day's storage thereof at 23° C. and 50% rh;
the viscosity of the coating formulation as measured in a state of high shear (60 rpm) after preparation with a surface-modified silicon dioxide and 1 day's storage of the preparation at 23° C. and 50% relative humidity (rh) is lower by not more than 25% than the viscosity of an otherwise identical coating formulation without a surface-modified silicon dioxide, as measured in a state of high shear (60 rpm), following preparation of the otherwise identical coating formulation and 1 day's storage thereof at 23° C. and 50% rh;
the at least one surface modified silicon dioxide is surfaced modified with a polyorganosiloxane, a modified polyorganoxiloxane, or a combination thereof having the following general structure:

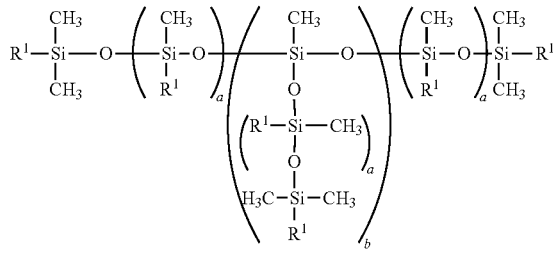

where
$R^1$ = a methyl radical or
$R^1 = (CH_3)_2CHCOCH_2C(CH_3)_2CHCH(CH_3)_2$

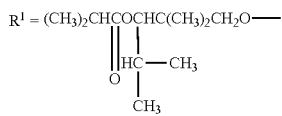

and/or
$R^1 = (CH_3)_2CHCOCHC(CH_3)_2CH_2O—$ and the sum of the units a=0 to 100, the sum of the units b=0 to 15, the ratio of methyl to alkoxy radicals among the radicals $R^1$ is smaller than 50:1, b>1 if a=0, and a>5 if b=0;
the coating formulation comprises at least one surface-modified silicon dioxide having a DBP (anhydrous) of 100-600 g/100 g; and
the at least one silicon dioxide surface modified with a moiety selected from the group consisting of a polyorganosiloxane, a modified polyorganosiloxane, and a combination thereof has a carbon content of 3-30%.

19. The coating formulation of claim 18, wherein the at least one silicon dioxide surface modified with a moiety selected from the group consisting of a polyorganosiloxane, a modified polyorganosiloxane, and a combination thereof has a carbon content of 3-20%.

20. The coating formulation of claim 18, wherein the at least one silicon dioxide surface modified with a moiety selected from the group consisting of a polyorganosiloxane, a modified polyorganosiloxane, and a combination thereof has a carbon content of 3-10%.

21. A coating formulation, comprising:
(1) 5%-99.5% by weight of solids of a polymer component or a mixture of two or more physically or chemically crosslinking polymer components;
(2) 0.5-15% by weight of solids of at least one silicon dioxide which is surface modified with a moiety selected from the group consisting of a polyorganosiloxane, a modified polyorganosiloxane, and a combination thereof; and
(3) 0%-80% by weight of at least one solvent or dispersing medium;
wherein:
the coating formulation is a matted thixotropic coating formulation, a pseudoplastic coating formulation, or a combination thereof;
the viscosity of the coating formulation as measured in a state of low shear (6 rpm) after preparation with the surface-modified silicon dioxide and 1 day's storage of the preparation at 23° C. and 50% relative humidity (rh) is lower by not more than 40% than the viscosity of an otherwise identical coating formulation without a surface-modified silicon dioxide, as measured in a state of low shear (6 rpm), following preparation of the otherwise identical coating formulation and 1 day's storage thereof at 23° C. and 50% rh;
the viscosity of the coating formulation as measured in a state of high shear (60 rpm) after preparation with a surface-modified silicon dioxide and 1 day's storage of the preparation at 23° C. and 50% relative humidity (rh) is lower by not more than 25% than the viscosity of an otherwise identical coating formulation without a surface-modified silicon dioxide, as measured in a state of high shear (60 rpm), following preparation of the otherwise identical coating formulation and 1 day's storage thereof at 23° C. and 50% rh;
the at least one silicon dioxide surfaced modified with a polyorganosiloxane, a modified polyorganoxiloxane, or a combination thereof is surface modified with a polyether-modified polyorganosiloxane, a (meth)acrylate-modified polyorganosiloxane, or a poly(meth)acrylate-modified polyorganosiloxane having the following general structure:

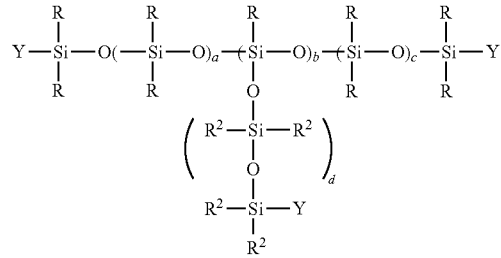 wherein $Y = —OH, —OR, H_5C_2—O—(C_2H_4O)_m—,$
$H_7C_3—O—(C_3H_6O)_m—$ or $R_2C\!=\!\!C—(CH_2-CH)_k—,$
$\phantom{H_7C_3—O—(C_3H_6O)_m— or R_2C\!=\!\!C}R^4\phantom{—(CH_2-}COOR^3$
R = alkyl,
$R^2$ = alkyl or H,
$R^3$ = alkyl,
$R^4$ = H alkyl, and
$a = 0\text{-}100, b = 0\text{-}15, c = 0\text{-}100, d = 0\text{-}100, m = 0\text{-}100$ and $k = 0\text{-}100;$ the coating formulation comprises at least one surface-modified silicon dioxide having a DBP (anhydrous) of 100-600 g/100 g; and
the at least one silicon dioxide surface modified with a moiety selected from the group consisting of a polyorganosiloxane, a modified polyorganosiloxane, and a combination thereof has a carbon content of 3-20%.

* * * * *